United States Patent

Guggemos

[11] Patent Number: 5,401,114
[45] Date of Patent: Mar. 28, 1995

[54] MANHOLE VENTILATION INSERT WITH DUCT SHUT-OFF DEVICE

[76] Inventor: Horst Guggemos, Sonnleitenweg 33, Graz A-8043, Austria

[21] Appl. No.: 64,070
[22] PCT Filed: Oct. 23, 1991
[86] PCT No.: PCT/AT91/00114
§ 371 Date: May 19, 1993
§ 102(e) Date: May 19, 1993
[87] PCT Pub. No.: WO92/09753
PCT Pub. Date: Jun. 11, 1992

[30] Foreign Application Priority Data

Nov. 26, 1990 [AT] Austria .................. 2392/90

[51] Int. Cl.⁶ ............................. E02D 29/14
[52] U.S. Cl. ............................. 404/25; 52/20; 137/364
[58] Field of Search .......... 404/25; 137/364, 363, 137/371, 398; 141/95, 86, 88

[56] References Cited

U.S. PATENT DOCUMENTS

| | | | |
|---|---|---|---|
| 1,865,387 | 6/1932 | Radomski | 137/398 |
| 3,173,442 | 3/1965 | McKillip | 137/247.23 |
| 3,712,009 | 1/1973 | Campagna | 52/20 |
| 4,067,659 | 1/1978 | Campagna, Jr. et al. | 404/25 |
| 4,094,346 | 6/1978 | Milo | 141/286 |
| 4,650,365 | 3/1987 | Runnels | 404/25 |

FOREIGN PATENT DOCUMENTS 3516277 11/1986 Germany .
59-233029 12/1984 Japan .
60-215928 10/1985 Japan .

Primary Examiner—Ramon S. Britts
Assistant Examiner—Pamela A. O'Connor
Attorney, Agent, or Firm—Salter & Michaelson

[57] ABSTRACT

In order to prevent the penetration of surface water into a shaft or manhole, the latter is fitted with an insert (5) consisting of a dish-shaped section (9) of impermeable material and the interior space of this dish is connected via connecting ducts (11) with the portion of the shaft or manhole located below the dish (9). The connecting ducts (11) are provided with shut-off devices (12) in the form of spherical floats which act in conjunction with a valve seat (13) to seal off the connecting ducts (11) when the level of liquid in the dish rises (FIG. 1).

9 Claims, 4 Drawing Sheets

MANHOLE VENTILATION INSERT WITH DUCT SHUT-OFF DEVICE

BACKGROUND AND SUMMARY OF THE INVENTION

The invention relates to an insert for a shaft, in particular a ventilatable sewer manhole. The said insert consists of a dish-shaped body made of impermeable material, preferably plastic, and its interior space is connected by at least one connecting duct with the part of the manhole located beneath the insert, and this connecting duct can be sealed by a shut-off device.

Underground pipe systems such as sewers, water mains, cable ducts and similar must as a rule be ventilated. Such ventilation is particularly important in the case of sewer installations because hydrogen sulphide vapours are formed here by aggressive or putrefying effluent, and if inadequate ventilation is provided these vapours will combine with water of condensation to form sulphuric acid which attacks the structures. In addition, dangerous gases frequently form in sewers and if the ventilation system is inadequate, these gases pose a serious danger to the maintenance personnel.

As a rule, the ventilation is assured by providing manholes through which access may be gained to the sewers. These manholes are sealed off at ground level by manhole covers made from concrete, steel or cast iron in which an adequate plurality of ventilation openings is provided. When rain falls, however, the disadvantage of such a design is that surface water flows through these ventilation openings into the sewer. In the event of heavy rainfall, the amounts of rainwater accumulating may be considerable. In cable ducts, the ingress of large volumes of water creates the risk of short circuits occurring. The cross sections of sewer installations are often inadequately dimensioned to carry away the sudden build-up of large amounts of surface water. Given the nowadays frequently adopted practice of employing separate sewers to handle on the one hand dirty effluent and on the other hand clean water, in particular storm water, it is absolutely essential to prevent storm water from penetrating into the sewer system carrying the dirty effluent, because on the one hand the cross sectional dimension of the latter system is not large enough to cope with such large, suddenly accumulating volumes of water, and on the other hand the sewage treatment plants provided to handle the dirty effluent, and also any pumping stations that are present, become heavily overloaded when large amounts of water suddenly pour in.

It has therefore already been proposed (in U.S. Pat. No. 4,650,365) that an insert containing a dish-shaped section made of impermeable material should be positioned below the manhole cover. The internal space of this dish-shaped section is connected with the part of the manhole below the insert, and a shut-off device is fitted in the connecting duct. At its upper edge the insert possesses a laterally projecting flange which rests on the supporting flange of a manhole frame provided for a manhole cover, and between the two flanges a seal is installed.

In this known embodiment the duct shut-off device takes the form of a pressure-release valve which is normally closed, so that no surface water can enter via the connecting duct, and the valve opens only when an overpressure builds up either in the portion of the manhole below the insert or in the sewer to which the shaft is connected. Thus, the gases generated in the sewer can escape only if an appropriately elevated pressure is reached at which the valve is caused to open. Totally unrestricted ventilation of the manhole and of the sewer connected to it, via the ventilation openings in the manhole cover, is thus not permitted by this known embodiment. Aggressive and/or dangerous gases which form are therefore not continuously vented so that the disadvantages described further above still exist with this known type of insert.

U.S. Pat. No. 4,957,389 describes a manhole insert consisting of a dish-shaped structure resting on and forming a liquid-tight seal with a support projecting from the wall of the manhole, and a drain opening, closable by a plug, is provided in the bottom of the dish. If the water collected in the dish section of the insert needs to be drained, i.e. if the dish is to be emptied, the plug has to be removed manually and once draining is completed the plug has to be replaced manually in the drain opening. In this known form of insert, the section of manhole below the insert is not ventilated to permit the escape of bad air and the inflow of fresh air.

It is the purpose of the present invention to improve a manhole insert of the type described at the beginning, namely in such a way that when large quantities of surface water occur as a result of heavy rainfall, this rainwater is substantially prevented from entering the part of the manhole below the insert, but also when the heavy rainfall ceases, continuous unrestricted ventilation of the manhole is guaranteed. In order to solve this task, the invention proposes that the ventilation duct shut-off device be activated as a function of the liquid level in the dish portion of the insert, such that when a predetermined liquid level is reached the duct is sealed. In the embodiment according to the invention, the shut-off device is generally open so that a connection exists between the space within the dish and the section of the manhole beneath the dish, and the manhole is continuously ventilated via this connection. If, in the event of heavy rainfall, a large amount of surface water penetrates into the manhole, for example via the ventilation openings in the manhole cover, this surface water collects in the dish-structure of the insert so that the liquid level rises, thereby activating the shut-off device so that no water can penetrate into the manhole via the connecting duct.

The shut-off device may be actuated in a variety of ways as a function of the liquid level in the dish; for example, sensors may be provided in the dish to detect the level of the liquid and, by means of an electrical control circuit, cause the shut-off device to operate. Preferably, however, the shut-off device takes the form of a float valve which seals off the duct when the level of liquid in the dish rises. The shut-off device may also be mechanically coupled with a separate float. However, a particularly simple design is obtained when the shut-off device consists of a preferably spherical float acting in conjunction with a valve seat arranged in the connecting duct.

In the manner according to the invention, the section of connecting duct below the shut-off device can extend upwards starting from a mouth provided near the floor of the dish. This results in a particularly simple design. If the liquid level in the dish rises and water enters into the connecting duct via its mouth, the float which forms the shut-off device is raised until it comes to rest against a valve seat, thereby sealing off the connecting duct.

The section of the connecting duct above the shut-off device may be connected with an opening provided in the side wall of the dish section of the insert, and a space, via which the manhole is ventilated when the shut-off device is in the open position, is left free between the side wall of the insert and the wall of the manhole and is connected with the part of the manhole below the insert. The design may also, however, be so arranged that the section of connecting duct above the shut-off device is connected via an elbow pipe to an opening provided in the bottom of the dish. In this case, the ventilation of the section of manhole beneath the dish takes place directly via the opening in the bottom of the dish, and this opening can be of suitably large dimensions.

In one embodiment of the insert according to the invention, plurality of connecting ducts is arranged along the side wall of the dish structure. The cross sections of these connecting ducts can then be kept small, and if a shut-off device fails to operate, or operates faultily, the ingress of water is still substantially prevented because only a quantity of water proportional to the cross sectional dimension of the respective connecting duct can enter into the section of the manhole below the dish structure.

The dish should ideally be designed in such a way that even if only small quantities of surface water get in, the liquid rapidly attains a level at which the shut-off device moves into its closed position. For this purpose, it is advantageous to provide in the centre of the dish a displacement body forming an integral part of the bottom of the dish. This displacement body not only reduces the volume of the dish but also reinforces the dish, especially the bottom of the dish, and prevents the bottom from bulging or even rupturing under the weight of deposits such as sand, etc. which can penetrate into the dish via the ventilation openings.

It is also possible to provide just one single connecting duct with a mouth arranged preferably in a well in the bottom of the dish and at a distance from the side wall of the dish. This makes the dish simpler and more compact in design, which is an advantage especially in the case of small-dimensioned manholes.

Once the rainfall has stopped, the remaining water which has collected in the dish must be removed so that the water level in the dish returns to a point where the shut-off devices in the connecting ducts open up and ventilation via the connecting ducts is restored. For this purpose, in addition to the connecting duct or ducts, the interior space of the dish is connected via at least one drain opening, arranged in a known manner in the bottom of the dish, with the section of the manhole below the dish; the total cross sectional area of the drain opening(s) is smaller than that of the connecting duct or ducts. If there is any water in the dish section, a certain amount of this water will penetrate into the section of the manhole beneath the dish via this (these) drain opening(s), but because of the Small cross sectional area of the opening(s) the amount of water is small and does not cause any disadvantages. The primary purpose is, in effect, not to eliminate totally the ingress of small quantities of water, but to prevent the sudden ingress of large volumes of water per unit of time which might cause damage in the sewer or main connected to the manhole, or which might exceed the handling capacity of a sewer or main of small cross sectional dimensions, or which might temporarily impose a heavy load on sewage treatment plants and pumping stations.

It must be possible to remove the insert, which is advantageously arranged directly beneath the manhole cover, either to permit cleaning or to allow personnel to descend inside the manhole. Furthermore, water must be prevented from entering between the insert and the wall of the manhole. This goal is achieved, in a known manner, by providing a seal between a laterally projecting mounting flange at the upper end of the dish and a supporting flange projecting from the wall of the manhole. A particularly good sealing effect is obtained when the seal is formed by inflatable, flexible tubing.

BRIEF DESCRIPTION OF THE DRAWINGS

In the drawing, the invention is illustrated on the basis of four embodiments.

DESCRIPTION OF THE PREFERRED EMBODIMENTS

Figure 1:
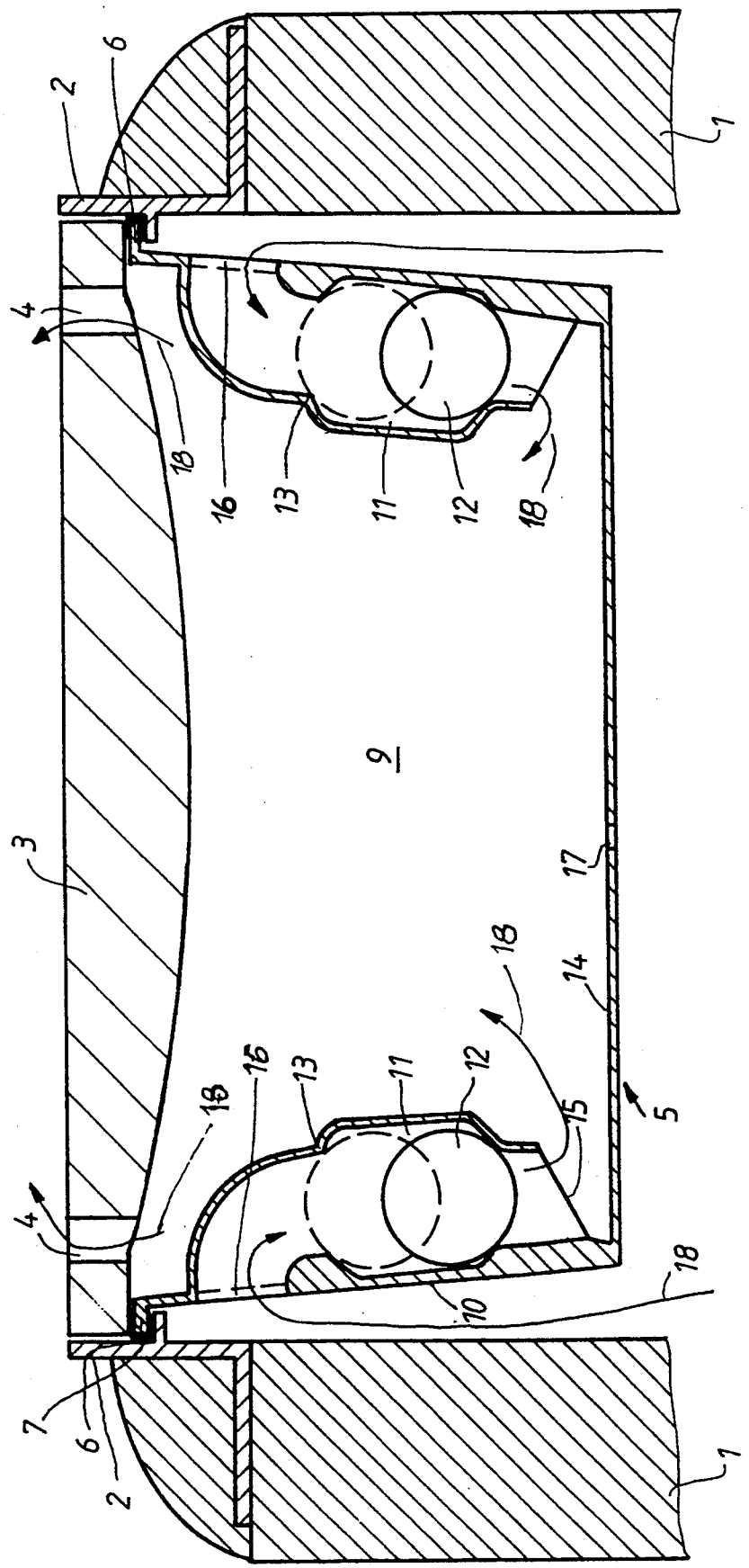
FIGS. 1 to 4 depict sections in a longitudinal plane, relative to the manhole, through various types of insert fitted in the manhole.

In all types, a frame 2 is provided at the upper end of a vertical manhole having walls 1, and the said frame provides a support for a manhole cover 3 arranged approximately at ground or street level. The manhole cover 3 possesses a plurality of ventilation openings 4 which are so dimensioned that the aggregate of their cross sections guarantees adequate ventilation of the manhole, but the cross section of each ventilation opening 4 is not large enough to pose any risk to human beings or animals.

Directly beneath the manhole cover 3 is fitted an insert 5 having a laterally projecting mounting flange 6 which is also supported on the frame 2. In order to obtain good sealing of this insert 5, the flange 6 is fitted all round with a rubber seal 7. In addition, as is apparent from FIG. 2, in addition to or in place of the rubber seal 7, an inflatable flexible tube 8 may be arranged between the outer wall of the insert 5 and the wall 1 of the manhole or the frame 2. Once inflated, this tube provides an absolutely liquid-tight seal. This ensures that any surface water penetrating through the gap between the frame 2 and the manhole cover 3 cannot enter the manhole.

The insert 5 consists of a dish- or trough-shaped body 9 made of plastic as in the embodiment depicted in FIG. 1. The side wall 10 of the dish 9 is positioned at a distance from the wall 1 of the manhole. Inside the dish 9, several connecting ducts 11 are distributed around the periphery, and each duct is provided with a spherical float acting as a shut-off device 12 acting in conjunction with a valve seat 13. The connecting ducts 11 run approximately vertically upwards from a mouth section arranged near the floor 14 of the dish, via a curved section, to an opening 16 in the side wall 10 of the dish 9. A small drain opening 17 is provided in the floor 14 of the dish.

Figure 2:
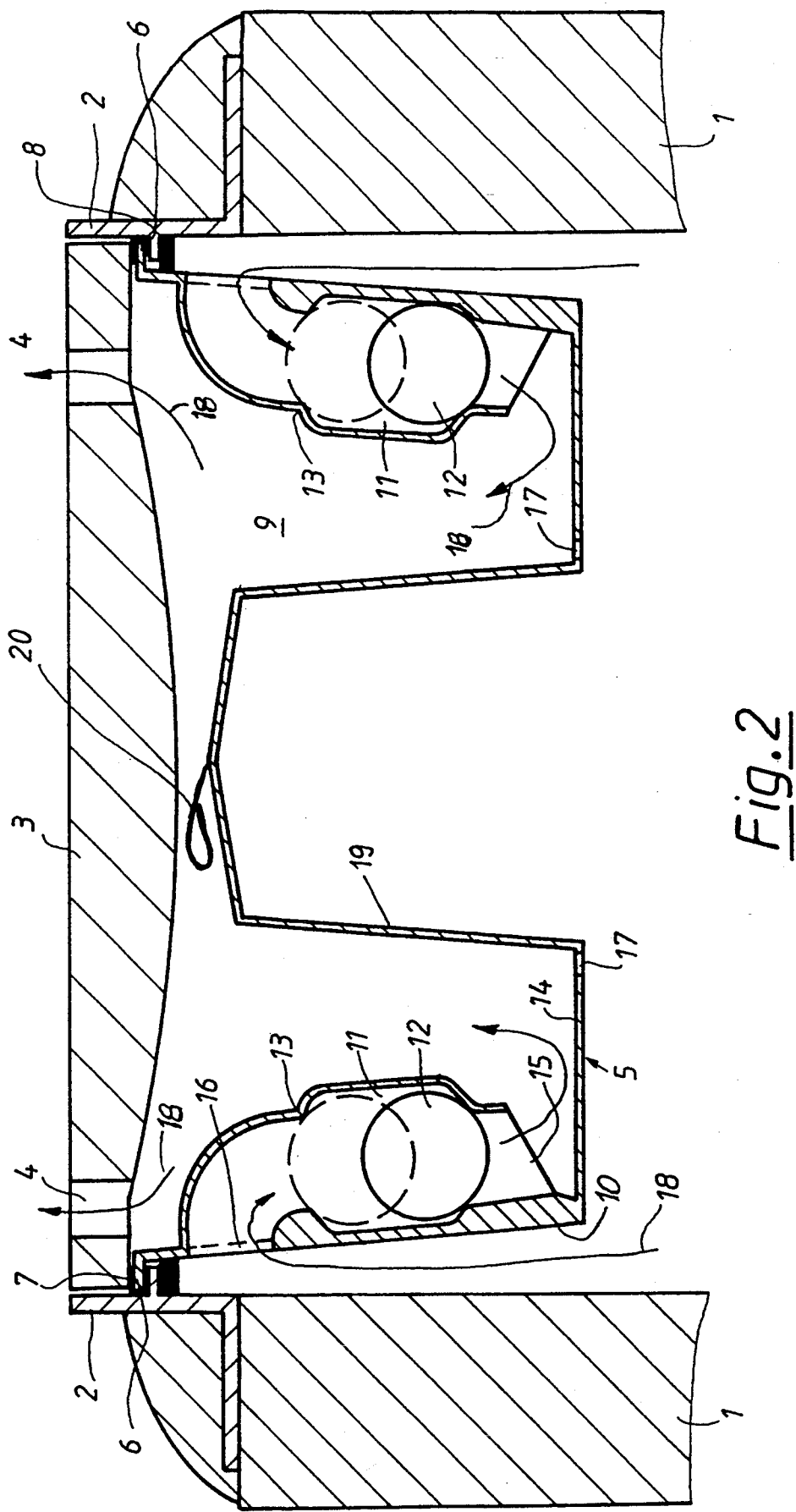

If no surface water penetrates via the ventilation openings 4 in the manhole cover 3, and if therefore the interior of the dish 9 does not contain any water, the shut-off devices 12 which are designed in the form of floats remain in the lower position denoted by the solid outlines in FIG. 1, and in this position the connecting duct 11 is not sealed off. Consequently, air can circulate freely from the portion of the manhole beneath the dish 9 via the connecting duct 11 and the ventilation openings 4 and out into the atmosphere, as indicated by the arrows 18. If, however, a large amount of surface water such as that following a heavy rainfall, enters the interior of the dish 9 through the ventilation openings 4 and is more than can be drained away through the small drain opening 17, then the level of liquid in the dish 9 rises, thereby raising the shut-off devices 12, which are designed as floats, until the latter come to rest against the valve seat 13, at which point the connecting ducts 11 are tightly sealed off and the water contained in the dish cannot penetrate into the part of the manhole beneath the dish 9 via these ducts. Since the drain opening 17 has a small cross section, only a very small portion of the water contained in the dish 9 can be drained away. If the dish 9 is full of water, no more water can get in via the ventilation openings 4 and the surface water flows away over the top of the manhole cover 3. It is thus advantageous to keep the volume of the dish 9 small. For this purpose, in the embodiment illustrated in FIG. 2, a displacement body 19, formed integrally with the floor 14 of the dish 9, is arranged approximately in the centre of the dish; this displacement body also serves to provide additional rigidity for the floor 14 of the dish. A loop 20 may be provided on this displacement body to simplify removal of the insert 5 from the manhole. Furthermore, in this embodiment, several small drain openings 17 are provided in the floor 14 of the dish section. Apart from these differences, the embodiment illustrated in FIG. 2 is identical to that depicted in FIG. 1.

Once no more surface water enters through the ventilation openings 4, for example when the rainfall ceases, the water in the dish 9 drains away slowly via the drain openings 17. The shut-off devices 12, which are designed as floats, then gradually sink downwards away from the valve seat 13 so that air can freely circulate once more in the direction indicated by the arrows 18.

Figure 3:
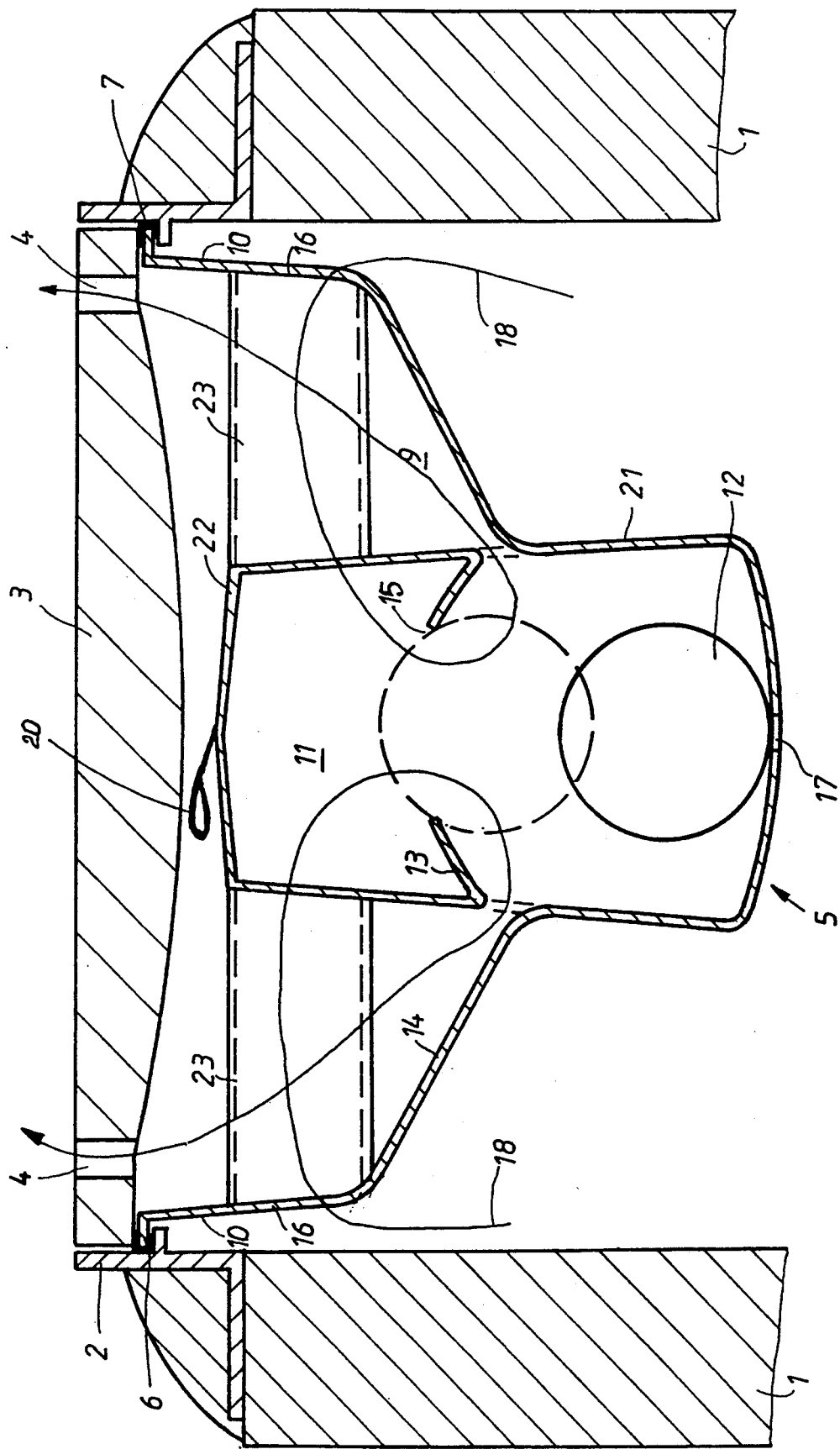

In the embodiment according to FIG. 3 a single connecting duct 11 is provided in the centre of the dish 9. In this embodiment, the floor 14 of the dish slopes sharply downwards and merges into a well section 21, containing at its deepest point the drain opening 17 and also the spherical shut-off device 12 designed as a float. Above the well 21 is located the opening 15 of the connecting duct 11, which is also designed with a valve seat 13. In the embodiment illustrated in FIG. 3 the connecting duct 11 consists of a hood section 22 closed at the top but connected at the sides to at least two tubes 23 arranged opposite to each other; at one end these tubes open into the interior of the hood section 22 and at the other end they are connected to openings 16 in the side wall 10 of the dish 9. At the same time, this hood section 22 forms a displacement body which reduces the volume of the dish 9 in the desired manner. If there is no water in the dish 9, the shut-off device 12, which is designed as a spherical float, assumes the lower position denoted by the solid outline depicted in the figure. The manhole is then ventilated again in the direction denoted by the arrows 18, and the gases emerging from the hood 22 when the shut-off device is not in contact with the valve seat 13 can flow out to the side, past the tubes 23. If, on the other hand, the dish 9 fills up with water penetrating via the ventilation openings 4, the shut-off device 12 comes to rest against the valve seat 13, thus preventing water from entering into the hood section 22 and from there via the tubes 23 into the chamber of the manhole below the dish 9.

Figure 4:
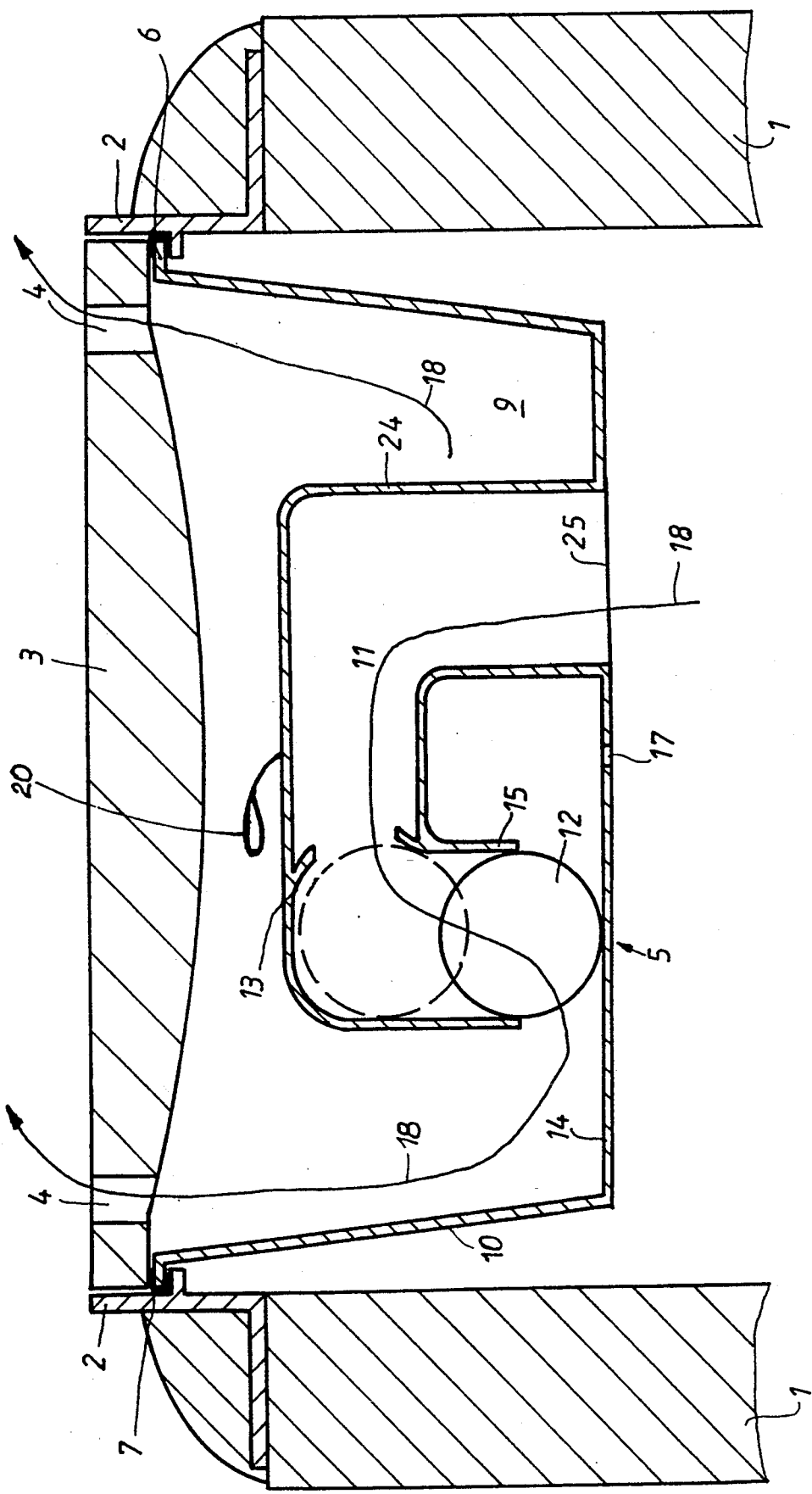

In the embodiment illustrated in FIG. 4, again only one connecting duct 11 is provided, and its mouth 15 is located at a certain distance from the floor 14 of the dish, and the duct is connected via an elbow pipe 24 with an opening 25 in the floor 14 of the dish. Again, the sealing of the connecting duct 11 is accomplished by means of a shut-off device 12 in the form of a spherical float which acts in conjunction with a valve seat 13 as soon as the shut-off device 12 is lifted up by the rising level of liquid in the dish 9. In this Figure, the flow direction of the gases escaping from the manhole is again denoted by the arrows 18.

I claim:

1. An insert for an opening of a manhole shaft comprising:
   a body including a flange portion for suspending said body within a frame defining said opening of said manhole shaft,
   said body further including a recessed dish portion defining an upwardly opening interior space, said dish portion being operative for capturing water entering said manhole opening,
   said dish portion including a bottom wall, a side wall, and a first aperture for draining said captured water from said dish portion into said manhole shaft,
   a first ventilation path between an interior of said dish portion and said manhole shaft;
   a second ventilation path between said interior space and ambient atmosphere;
   a connecting duct positioned in the interior space of the dish portion for connecting said first and second ventilation paths, said connecting duct including a mouth portion arranged adjacent to said bottom wall; and
   a closure device for closing said connecting duct when said captured water rises to a predetermined level in said dish portion.

2. In the insert of claim 1, said connecting duct including a cylindrical valve seat, said closure device comprising a spherical float which engages and cooperates with said valve seat when said captured water rises to a predetermined level.

3. The insert of claim 1 further comprising an inflatable tube positioned between said body and said frame of said manhole opening.

4. In the insert of claim 1, said first ventilation path comprising an opening in said side wall, said connecting duct including a first end disposed around said opening and a mouth portion positioned adjacent said bottom wall, said closure device being positioned inside said duct at a level above said mouth portion.

5. In the insert of claim 4, said connecting duct including an internal cylindrical valve seat, said closure device comprising a spherical float valve which engages and cooperates with said valve seat when said captured water rises to a predetermined level.

6. In the insert of claim 1, said mouth portion of said duct including a cylindrical valve seat, said closure device comprising a spherical float arranged in the center of the bottom wall, said spherical float valve engaging and cooperating with said valve seat when said captured water rises to a predetermined level.

7. In the insert of claim 1, said first aperture having a cross-sectional area which is less than a cross-sectional area of said first ventilation path.

8. An insert for an opening of a manhole shaft comprising:
   a body including apparatus for suspending said body within a frame defining said opening of said manhole shaft,
   said body further including a recessed dish portion defining an upwardly opening interior space, said dish portion being operative for capturing water entering said manhole opening, said dish portion including a bottom wall, a side wall, and a first aperture for draining said captured water from said dish portion into said manhole shaft, a first ventilation path between an interior of said dish portion and said manhole shaft;

a second ventilation path between said interior space and ambient atmosphere;

a connecting duct positioned in the interior space of the dish portion for connecting said first and second ventilation paths, said connecting duct including a mouth portion arranged adjacent to said bottom wall; and a closure device for closing said connecting duct when said captured water rises to a predetermined level in said dish portion.

9. An insert for an opening of a manhole shaft comprising:

a body including apparatus for suspending said body within said opening of said manhole shaft, said body further including a recessed dish portion defining an upwardly opening interior space, said dish portion being operative for capturing water entering said manhole opening, said dish portion including a bottom wall, a side wall, and a first aperture for draining said captured water from said dish portion into said manhole shaft, a first ventilation path between an interior of said dish portion and said manhole shaft;

a second ventilation path between said interior space and ambient atmosphere;

a connecting duct positioned in the interior space of the dish portion for connecting said first and second ventilation paths, said connecting duct including a mouth portion arranged adjacent to said bottom wall; and a closure device for closing said connecting duct when said captured water rises to a predetermined level in said dish portion.

* * * * *